Sept. 26, 1939. F. A. WELSMILLER ET AL 2,174,337
METHOD OF MAKING FLEXIBLE VALVE SEATS
Filed Sept. 21, 1937 2 Sheets-Sheet 1

INVENTOR.
FREDERICK A. WELSMILLER
ANDREW SCHNEIDER
BY
Kwis Hudson & Kent
ATTORNEYS Sept. 26, 1939.  F. A. WELSMILLER ET AL  2,174,337
METHOD OF MAKING FLEXIBLE VALVE SEATS
Filed Sept. 21, 1937    2 Sheets-Sheet 2

INVENTOR.
FREDERICK A. WELSMILLER
BY ANDREW SCHNEIDER
Kwis Hudson & Kent
ATTORNEYS Patented Sept. 26, 1939

2,174,337

UNITED STATES PATENT OFFICE 2,174,337

METHOD OF MAKING FLEXIBLE VALVE SEATS

Frederick A. Weismiller and Andrew Schneider, Saginaw, Mich., assignors to Eaton Manufacturing Company, Cleveland, Ohio, a corporation of Ohio Application September 21, 1937, Serial No. 164,888

3 Claims. (Cl. 29—156.7)

The present invention relates to a method of making valve seats, and more particularly to a method of making flexible valve seat elements or inserts for internal combustion engines.

An object of the present invention is the provision of a novel method of making flexible valve seat elements or inserts for internal combustion engines of the poppet valve type, so constructed and arranged that the valve seat proper is free to move relative to its supporting portion and to the supporting member, which in the case of an internal combustion engine is usually the engine cylinder.

Another object of the present invention is the provision of a novel method of making flexible valve seat elements or inserts for internal combustion engines of the poppet valve type, the seating portion of which is coated with a high heat-resisting alloy and is free to move relative to its supporting portion and to the supporting member, which member, in the case of an internal combustion engine, is usually the engine cylinder.

Another object of the present invention is the provision of a novel method of making flexible valve seat elements or inserts for internal combustion engines of the poppet valve type, comprising inner annular seating portions and outwardly spaced supporting portions wherein the groove or space between the aforesaid portions is made by first making a large groove and substantially closing the large groove a predetermined amount.

Another object of the present invention is the provision of a novel method of making a flexible valve seat element or insert for an internal combustion engine of the poppet valve type, comprising an annular seating portion surrounded by an annular supporting portion spaced from the seating portion and connected thereto by a thin-walled annular portion, wherein the groove between the outer supporting portion and the inner seating portion is formed by first making a comparatively large groove which undercuts the inner seating portion, and subsequently contracting the portion externally of the groove to bring the respective parts into predetermined relationship.

Further objects and advantages of the present invention will be apparent to those skilled in the art to which the invention relates from the following disclosure and description of the preferred manner of practicing the invention described with reference to the accompanying drawings forming a part of this specification, in which similar reference characters designate corresponding parts, and in which.

Generally speaking the method of the present invention comprises forming a flexible valve seat element or insert for an internal combustion engine of the poppet valve type, which element or insert comprises an outer annular supporting portion and an annular seat formed on the upper end of an inner annular thin-walled portion spaced from the outer annular supporting portion by an annular groove, a portion of which groove undercuts part of the inner annular portion, by cutting a comparatively wide annular groove in a suitable piece of stock or material, subsequently contracting the stock externally of the groove to close the groove a desired amount, and machining the stock or blank to the required shape either before or after formation of the aforesaid groove or partly before and partly after forming said groove.

Figure 1:
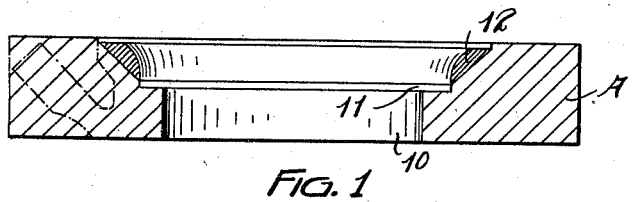
Fig. 1 is a section through a partly formed flexible valve seat element or insert for an internal combustion engine constructed in accordance with the process of the present invention.
Figure 2:
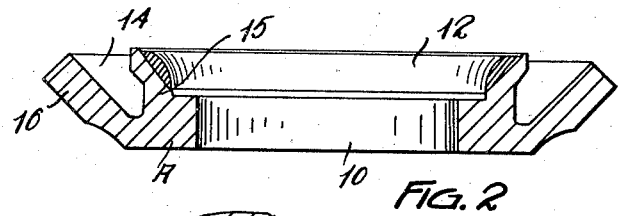
Fig. 2 is a section similar to Fig. 1 showing the valve seat element shown in Fig. 1 in a further stage of manufacture.
Figure 3:
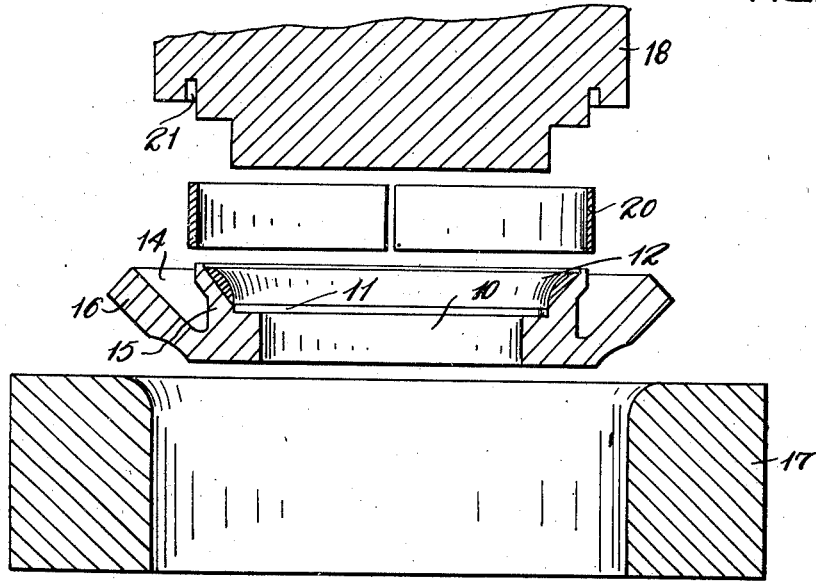
Fig. 3 is an expanded section of the punch, spacer ring and valve seat element shown in Fig. 2, and die showing a further step in the process.

The first step in the preferred manner of practicing the process of the present invention, as shown herein, is the provision of an annular piece of stock or blank A of suitable material having a cylindrical aperture 10 therein, counterbored as at 11. A coating 12 of high heat-resisting alloy, such as stellite, may be applied in the usual manner to ultimately form the seat proper on the counterbore 11. A comparatively wide annular groove 14 is then cut in the blank A in spaced relation to the counterbore 11 with a portion of the groove 14 undercutting a part of the inner annular portion 15 formed thereby. The remainder of the blank, that is, the part thereof externally of the groove 14, is finished as indicated in Fig. 2.

Figure 4:
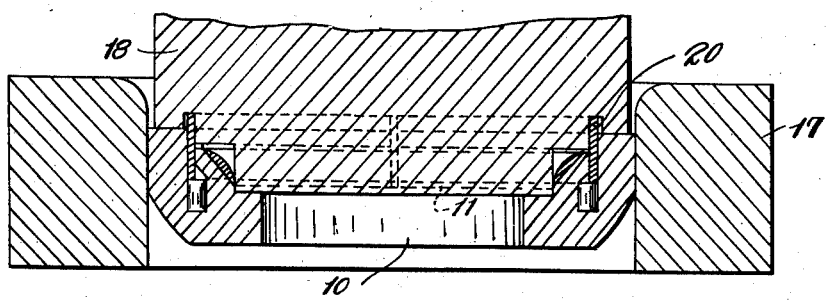
Fig. 4 is a view similar to Fig. 3 showing the elements in mated position.
Figure 5:
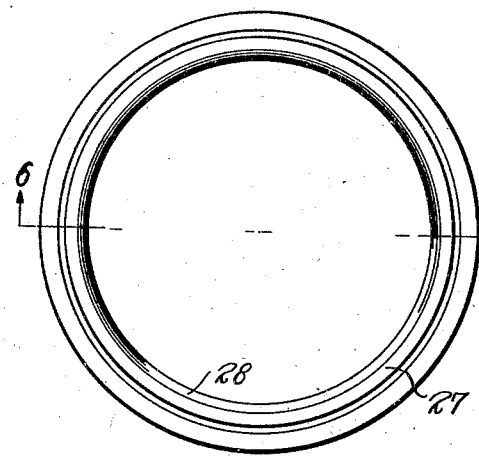
Fig. 5 is a plan of the finished valve seat element shown in the preceding figures.
Figure 6:
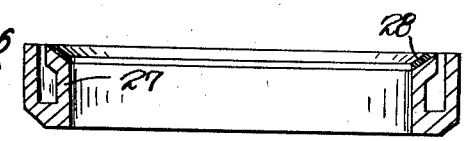
Fig. 6 is a section on the line 6—6 of Fig. 5.

In this form the blank externally of the groove 14 consists of an annular ring or flange 16 projecting at an angle to the remainder thereof. The next step in the process comprises contracting the annular flange 16 to partially close the groove 14 by forcing the blank through a suitable die 17 by means of a stepped punch 18. In order to maintain a predetermined spaced relation between the outer annular supporting portion and the inner annular seating portion a split ring 20, adapted to be carried in a recess 21 formed in the bottom end of the punch 18, is adapted to project within the groove 14 in the blank during the forming operation. The blank is preferably heated previous to being forced through the die 17 to assist the operation and to minimize the stresses set up between the various parts of the blank. The punch 18 forces the blank through the die 17 with the spacer ring 20 in position as shown in Fig. 4. The blank including the coating of high heat-resisting alloy is subsequently machined or ground to the desired final shape shown in Figs. 5 and 6.

Figure 7:
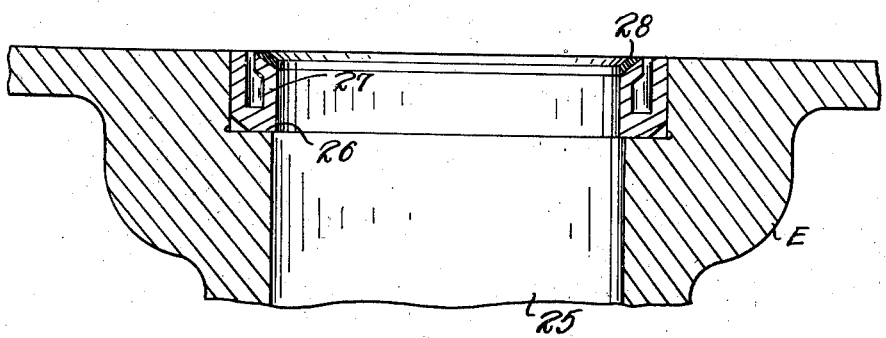
Fig. 7 is a section of the valve seat element shown in Figs. 5 and 6 assembled in a valve port of an internal combustion engine.

In Fig. 7 the finished valve seat element or insert is shown assembled with a valve port 25 of an internal combustion engine designated generally by the reference character E. The valve port is recessed, as at 26, to provide a seat for the valve seat element or insert, which may be press fitted, shrunk, welded, brazed or otherwise secured therein. The material of the valve seat is preferably so chosen with regard to its coefficient of thermal expansion that it will not tend to come loose at any operating temperature to which it is subject. Because of the relatively thin-walled annular portion 27 which carries the seat proper the annular seating surface 28 is free to move under the influence of the valve, to retain its seating relation irrespective of changed conditions due to the operation of the engine.

While the preferred manner of practicing the process of the present invention has been described with considerable detail it is to be understood that the invention is not limited to the specific steps herein shown and described which may be varied within the scope of this invention. For example, the aperture 10 in the blank A may be formed subsequent to the formation of the groove 14. In like manner the valve seat may be ground prior to the contraction of the flange or part 16. It is our intention to cover hereby all modifications and variations of the process disclosed that come within the practice of those skilled in the art to which the present invention relates and which fall within the sphere and scope of the present invention as defined in the appended claims.

Having thus described our invention, we claim:

1. The method of making a ring-like flexible valve seat element for an internal combustion engine of the poppet valve type which comprises providing a suitable frusto-conical shaped blank having a counterbored aperture extending therethrough with the large end of said aperture which also forms the seat proper opening into the large end of the blank and an annular tapered groove converging towards its bottom in the large end of the blank in spaced relation with said counterbore and undercutting a portion of the blank radially inwardly of the groove, the outer side wall of said groove diverging toward the surface of the blank, contracting the portion of the blank externally of the groove to only partly close said groove, and subsequently machining the blank to the desired final shape.

2. The method of making a ring-like flexible valve seat element for an internal combustion engine of the poppet valve type which comprises providing a suitable blank having a counterbored aperture extending therethrough the large end of which aperture also forms the seat proper, machining said blank to a frusto-conical shape by a turning operation with the taper thereof converging in the direction of the small end of said aperture and turning an annular tapered groove converging towards its bottom in the large end of the blank in spaced relation with said counterbore undercutting a portion of the blank radially inwardly thereof with the outer wall of said groove diverging outwardly toward the surface of the blank forming a body portion proper having an external inclined annular flange connected to the body portion adjacent the end of the blank in which the small end of said aperture opens, subsequently contracting the portion of the blank externally of the groove to only partly close said groove by forcing the blank into a die, and thereafter machining the blank to the desired final shape.

3. The method of making a ring-like flexible valve seat element for an internal combustion engine of the poppet valve type which comprises: providing a suitable frusto-conical shaped blank having a counterbored aperture extending therethrough with the large end of said aperture which also forms the seat proper opening into the large end of the blank and an annular tapered groove converging towards its bottom in the large end of the blank in spaced relation with said counterbore and undercutting a portion of the blank radially inwardly of the groove, the outer side wall of said groove diverging toward the surface of the blank; placing an annular ring-shaped mandrel in said groove and contracting the portion of the blank externally of the groove against said mandrel to partially close the groove by forcing the blank into a die; subsequently removing said mandrel; and machining the blank to the desired final shape.

FREDERICK A. WELSMILLER.
ANDREW SCHNEIDER.